May 4, 1965 H. S. HORN 3,182,302
DIGITAL TO ANALOG SIGNAL CONVERSION
Filed Sept. 12, 1960
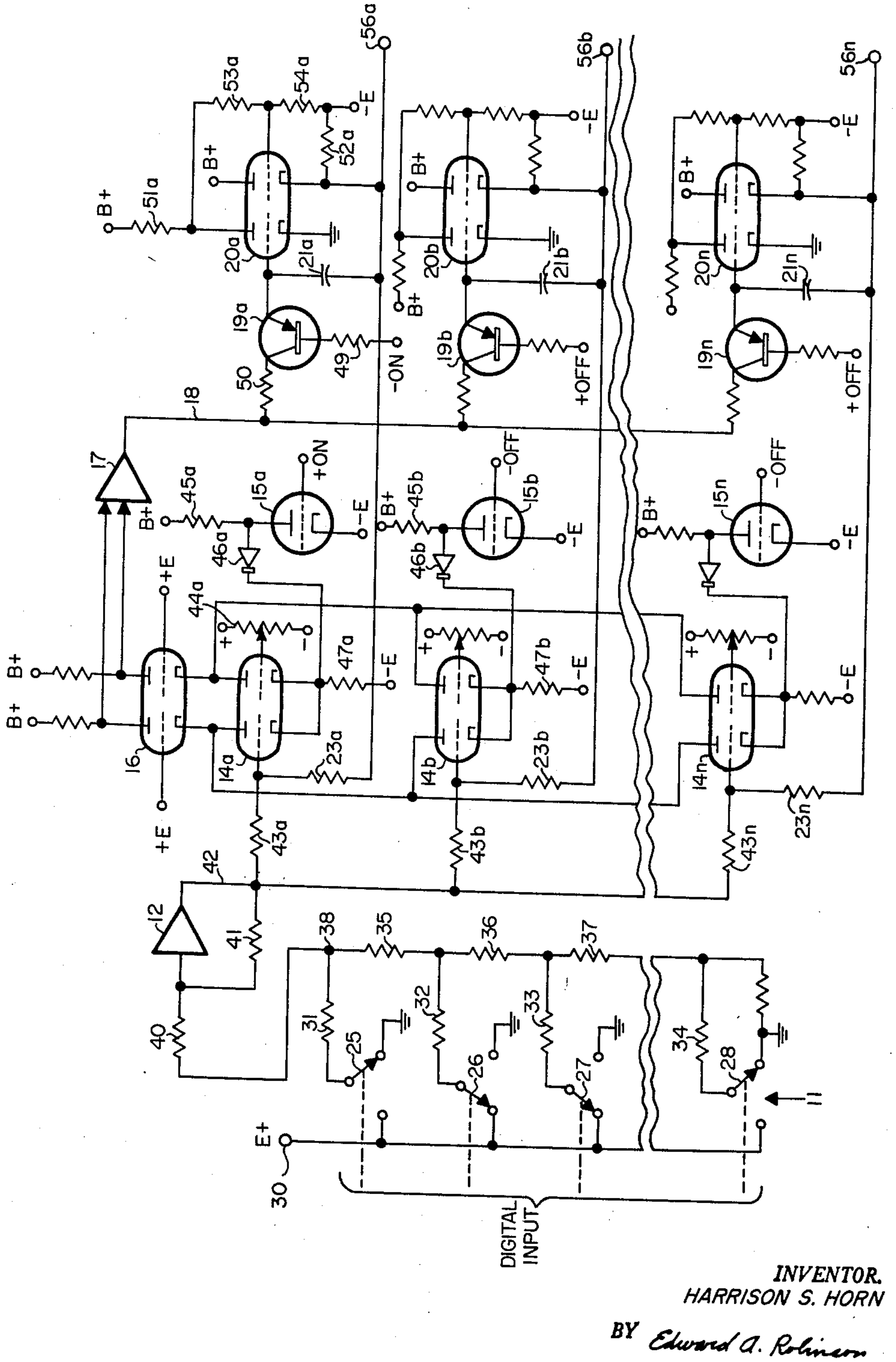
INVENTOR.
HARRISON S. HORN
BY Edward A. Robinson
attorney 3,182,302

DIGITAL TO ANALOG SIGNAL CONVERSION

Harrison S. Horn, Palo Alto, Calif., assignor to General Precision, Inc., Binghamton, N.Y., a corporation of Delaware Filed Sept. 12, 1960, Ser. No. 55,285
5 Claims. (Cl. 340—347)

This invention relates to electronic computers and devices using both analog and digitally coded signals, and more particularly this invention relates to circuits and apparatus for converting digitally coded signals representative of numerical quantities into corresponding analog signals.

There are basically two types of electronic computing circuits, i.e., analog circuits and digital circuits. Analog circuits generate and pass signals having an amplitude or intensity representative of numerical quantities, and mathematical operations such as summing, multiplying, differentiating and integrating may be performed upon these signals by such analog apparatus as operational amplifiers and the like. On the other hand, digital circuits provide coded representations of numbers, and the mathematical operations performed thereon such as adding, subtracting, multiplying and dividing are accomplished by apparatus totally unlike the analog apparatus. An electronic computer may receive information or data in either analog or digital form and it is sometimes necessary that digitally coded signals be converted into corresponding analog signals, or vice versa, and various analog-to-digital and digital-to-analog conversion circuits have been developed.

Several different digital quantities may arise in a single electronic computer and it may be necessary to convert several digital signals into corresponding analog signals. Obviously, the compter may employ a plurality of separate digital to analog conversion circuits, but it has been found more economical to provide a single conversion circuit which is multiplexed to several digital input circuits and several corresponding analog output devices, and which operates on a time-sharing basis therewith. Various digital inputs may be applied sequentially to the converter which in turn furnishes corresponding analog output signals to various corresponding output circuits, each employing a storage means for retaining the output signals at a constant level during the intervals between successive conversion operations.

It is an object of this invention to provide an improved multiplexed digital-to-analog signal conversion system and more specifically it is an object to provide an arrangement having improved output branches to permit a rapid switching from one circuit to another such that the switching operations will create no deleterious transient effect upon the analog output signals.

Another object of this invention is to provide an improved output switching arrangement for digital-to-analog converters wherein the switches are effectively included within operational amplifiers and wherein each branch circuit may include a direct feedback path encompassing the amplifiers and the switches and improving the overall linearity for signals passed therethrough.

Other objects and many attendant advantages of this invention may be readily appreciated as they become better understood by reference to the following detailed description when considered with the accompanying drawing, the single figure of which is a circuit diagram of a multiplexed digital-to-analog signal conversion arrangement constructed according to the teachings of this invention.

Briefly stated, according to a preferred embodiment of this invention, digitally coded input signals are applied to a ladder network 11 that generates analog voltages which are passed by an operational amplifier 12. The analog signals are passed to balanced amplifier tubes 14*a*, 14*b* and 14*n* which are normally non-conductive, but which are sequentially biased into conduction by control switching triodes 15*a*, 15*b* and 15*n*. The analog signals from the tube 14*a*, 14*b* or 14*n* which are conductive are passed through a grounded grid amplifier tube 16 and thence through further stages of balanced amplification indicated generally by an amplifier 17. The output from the amplifier 17 is a lead 18 coupled to transistor switches 19*a*, 19*b* and 19*n*. One of the transistors 19*a*, 19*b* or 19*n* is rendered conductive corresponding to the switching control tube 15*a*, 15*b* or 15*n* respectively, and the analog signals are passed to a double triode 20*a*, 20*b* or 20*n* for further amplification. Control pulses to the transistors 19*a*, 19*b* and 19*n* must be of lesser duration than the corresponding control pulses to the tubes 15*a*, 15*b* and 15*n* to avoid undesirable transient effects. Capacitors 21*a*, 21*b* and 21*n* are associated with each of the double triodes and function to store the analog voltage levels during those times when the respective transistors 19 are non-conductive. Each capacitor 21*a*, 21*b* or 21*n* together with the associated amplifier tubes 20*a*, 20*b* or 20*n* constitute a holding amplifier. Resistors 23*a*, 23*b* and 23*n* constitute direct feedback paths encompassing the stages of amplification together with the switches associated therewith, and since no switching is contained in the feedback path, the linearity is maintained throughout the whole amplifier and switching system.

The ladder circuit 11 may receive a digitally coded input signal by the setting of relay switches 25, 26, 27 and 28 which may be accomplished manually or by energizing relay windings (not shown). However, the operation of mechanical relays is ordinarily too slow to be useful in a computer, and these switches may be replaced with fast electronic components such as transistors which will function as switches. A co-pending application for United States Letters Patent entitled "Analog to Digital Signal Conversion," Serial No. 14,874 filed March 14, 1960, now Patent No. 3,145,376, by Gerard Currie and assigned to the same assignee as the instant application discloses a more sophisticated ladder arrangement using transistor switching. A similar transistor switching arrangement may be used to replace the ladder circuit 11 to permit a fast operation. Although the ladder circuit 11 indicates but four digital input lines controlling the four switches 25 through 28, it will be appreciated that this circuit may be extended to include any desired number of parallel digital inputs to provide signals of any desired accuracy.

Operation of the various switches 25 through 28 will impress a reference potential from a terminal 30 through various legs of a resistive network including resistors 31 through 37 upon an output point 38. The value of the resistors 31 through 37 is such that the switches 25 through 28 may produce a binary addition of voltages, and the resultant potential at the point 38 will be in accordance with a binary coded input signal operating the switches. Therefore, the ladder circuit 11 receives digitally coded signals which operate the various switches 25 through 28 and causes an analog voltage to be developed at the point 38 corresponding to the digital code. The operation of a ladder circuit is more fully explained in the co-pending patent application, Serial No. 14,874, supra.

A resistor 40 couples the signal from the ladder circuit to an operational amplifier 12 which is provided with a feedback resistor 41 and functions to provide a low impedance output voltage to a line 42. The signals are thence passed via respective resistors 43*a*, 43*b* and 43*n* to the balanced amplifier tubes 14*a*, 14*b* and 14*n*. For an understanding of this invention, it may be assumed that the tube 14*a* has been rendered conductive by the control switching tube 15*a* while the remaining balanced amplifying tubes 14*b* and 14*n* remain non-conductive. While a signal voltage is applied to the grid of the left side of the tube 14*a*, a balancing voltage derived from a potentiometer 44*a* is impressed upon the grid of the right triode.

A positive (on) bias is impressed upon the grid of the switching triode 15*a* causing conduction therethrough with a corresponding decrease in the anode voltage resulting from a voltage drop across a load resistor 45*a*. Since the anode voltage of the tube 15*a* is decreased, a diode 46*a* is cut-off thereby isolating the cathodes of the tube 14*a* from the control tube 15*a*. Conversely, the switching tube 15*b* is rendered non-conductive by a negative (off) potential applied to the grid thereof. Since the tube 15*b* is non-conductive there is no voltage drop across a load resistor 45*b* due to conduction through the tube 15*b*, and therefore, a diode 46*b* is biased into conduction by the B+ voltage. The diode 46*b* thereby provides a conductive path through the resistor 45*b* and a common cathode resistor 47*b* associated with the tube 14*b*, and the cathodes are raised to a positive potential such that the tube 14*b* is rendered non-conductive.

The cathodes of the tube 16 are directly connected to the anodes of the conducting tube 14*a* thereby providing a cascade amplifying arrangement. The tubes 14*a*, 14*b* and 14*n* in conjunction with the tubes 15*a*, 15*b* and 15*n* constitute switching devices, and the balanced tube 16 is a common grounded grid amplifier and may be considered as a part of the balanced amplifier 17. By providing balanced amplifying stages, undesirable transient pulses resulting from the switching operations may be minimized.

Continuing the assumption that the switch 14*a*–15*a* is "on," we must also assume that the transistor 19*a* is rendered conductive or "on" by an appropriate negative bias applied to the base electrode thereof through a resistor 49. In such case, the analog voltage from the amplifier 17 is passed through the transistor 19*a* to charge the capacitor 21*a*. A current limiting resistor 50 prevents an unduly great current surge from the amplifier 17 to the capacitor 21*a* when the transistor 19*a* is first turned "on."

The left triode of the tube 20*a* may be considered as a conventional amplifier with a load resistor 51*a* coupled between the anode and the B+ voltage supply. The right triode of the tube 20*a* is connected as a cathode follower with a load resistor 52*a* coupling the cathode to a point of negative reference potential. Resistors 53*a* and 54*a* provide coupling from the anode of the amplifier to the grid of the cathode follower.

The capacitor 21*a* is coupled between the cathode output of the cathode follower and the grid input of the left triode of tube 20*a*. Therefore, the tube 20*a* functions as an integrating amplifier while the transistor 19*a* is conductive, but during intervals when the transistor 19*a* is non-conductive the capacitor 21*a* will retain its charge and the tube 20*a* will function as a holding amplifier providing a constant analog output at a terminal 56*a* during those non-conductive intervals of the transistor 19*a*.

It may be appreciated that the various analog output circuits will be successively coupled to receive signals from the ladder circuit 11 and the operational amplifier 12 as conditioning voltages are simultaneously impressed upon the grid of the triodes 15*a*, 15*b* and 15*n* and the base electrodes of the respective transistors 19*a*, 19*b* and 19*n*; and each of the output circuits will store a constant charge in its capacitor during intervals between conversion operations. Therefore, signals will appear at each output terminal 56*a*, 56*b* and 56*n* which are periodically corrected to correspond to changes in the digital input signals which are synchronous with the switching operations.

As indicated by the break lines in the drawing, the system may be expanded to include any desired number of analog output circuits. Obviously, the accuracy of the circuits will depend on the ability of the capacitors 21*a*, 21*b* and 21*n* to retain charge over the intervals between signal conversion operations, and this fact will limit the number of permissible digital-analog channel combinations in a multiplexed system, since an unduly large number of circuits may result in a prolonged waiting interval for each circuit. If, however, the need for accuracy is different with different output circuits, the sequential order of the conversion operations may be modified to give a preference to those output circuits requiring a high degree of accuracy at the expense of other output circuits requiring a lesser degree of accuracy. For example, it may be assumed that a circuit A passes a signal requiring a high degree of accuracy while other circuits B, C, D, etc. pass signals wherein a greater error may be tolerated. In such a case, the switching sequence may be "A–B–A–C–A–D–etc."; and the voltage stored by the capacitor of the A-circuit will be corrected at very brief intervals while capacitors of the remaining circuits must retain charge over much longer intervals.

The resistor 23*a* provides a direct connection between the output terminal 56*a* and the grid input electrode of the balanced switching amplifier 14*a*. Such a direct connection provides a feedback path having no switches therein and functions to linearize the signal as it is passed through the circuitry which may be deemed to include two switches and at least two amplifiers. Since no switching is possible in the direct feedback path, no feedback error may be introduced resulting from poor contacts or high impedances wihch may be attendant with switching functions either mechanical, with vacuum tube circuits or with transistor circuits. Thus, it will be appreciated that an important feature of this invention resides in providing an overall direct feedback path encompassing the amplifiers and associated switches. Therefore, if the switching function provided by the transistor 19*a* is considerably less than perfect with a relatively high impedance coupling produced during intervals when the transistor is "on," the overall amplification combined with the linearization of the direct negative feedback path 23*a* will provide an accurate output voltage regardless of poor switching and high impedance in the forward path of the amplifying-switching circuits.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A multiplexed digital to analog signal converter comprising an input circuit for receiving digitally coded signals and for generating analog voltages corresponding thereto, a plurality of balanced amplifiers each having one control electrode coupled to the input circuit for receiving the analog voltages and having a second control electrode coupled to receive a balancing voltage, a switching means for biasing a selected one of the balanced amplifiers into conduction, another amplifier coupled to receive signals from the plurality of balanced amplifiers, a plurality of transistor switches corresponding to the plurality of balanced amplifiers and coupled to receive and selectively pass signals from the other amplifier, a holding amplifier coupled to each of the transistor switches and operable to retain a constant output signal during intervals when the transistor switch is non-conductive; and a direct feedback path coupled between each holding amplifier and the corresponding balanced amplifier for providing an overall negative feedback.

2. A multiplexed digital to analog signal converter comprising an input circuit for receiving digitally coded signals and for generating analog voltages corresponding thereto, a plurality of balanced amplifier tubes having double triode structures each with a cathode, a grid and an anode, means coupling one grid of each tube to the input circuit for passing the analog voltage thereto, means coupled to the second grid of each tube for impressing thereon a balancing potential, another double triode tube arranged as a balanced grounded grid amplifier and directly connected to the anodes of all of said balanced amplifier tubes, a switching means coupled to the cathodes of each balanced amplifier tube and operable to bias into conduction a selected one of the balanced amplifier tubes whereby signals are passed therethrough to the grounded grid amplifier, further amplifying means coupled to the grounded grid amplifier, a plurality of transistors coupled to receive signals from the further amplifying means, means for biasing into conduction a selected one of the transistors corresponding to the balanced amplifier tube which is likewise biased into conduction, a holding amplifier coupled to receive signals from each transistor, and a direct feedback path coupled between each holding amplifier and the corresponding balanced amplifier for providing an overall negative feedback.

3. A multiplexed digital to analog signal converter comprising, an input ladder network for receiving digitally coded signals and for generating analog signals corresponding thereto; a plurality of output circuits each including an output terminal and means for storing one of said analog signals; multiplexing means coupling said analog signals to a predetermined output circuit, said multiplexing means including individual switching means and a common balanced amplifier; a plurality of individual feedback paths; and circuit means connecting each of said feedback paths between one of said output terminals and a respective one of said individual switching means, whereby said analog signals are linearized through said individual switching means and said common balanced amplifier in combination.

4. A multiplexed digital to analog signal converter comprising, an input circuit for receiving digitally coded signals and operable to generate analog voltages corresponding thereto; a plurality of output circuits each selectively operable to pass a respective one of said analog voltages and including means for storing said respective analog voltage and an individual output terminal, each of said output circuits further including first and second switching means; an amplifier; means coupling said amplifier intermediate all of said first and second switching means in order that said amplifier amplifies the analog voltage provided by any of said first switching means; means rendering operative a selected one of said second switching means during the time interval a corresponding one of said first switching means is rendered operative to couple an analog voltage to a predetermined one of said output terminals; and circuit means coupling said output terminal to the input of the associated one of said first switching means to thereby provide an accurate output analog voltage independent of the dynamic impedance of said output circuit.

5. A multiplexed digital to analog signal converter comprising, an input circuit for receiving digitally coded signals and operable to generate analog voltages corresponding thereto; a plurality of output circuits each selectively operable to pass a respective one of said analog voltages including first and second switching means; a common amplifier; means connecting said common amplifier between the output of all of said first switching means and the input of all of said second switching means; means selectively operable to switch one of said first and said second switching means from a nonconducting to a conducting state; said plurality of output circuits further including a holding amplifier having a storage capacitor associated therewith operable to maintain the analog voltage developed at said output terminal at a constant level between switching intervals; means coupling each of said holding amplifiers between the output of one of said second switching means and said output terminals; a plurality of negative feedback means; and means coupling each of said negative feedback means between one of said output terminals and the input of the corresponding first switching means.

References Cited by the Examiner

UNITED STATES PATENTS

| | | | |
|---|---|---|---|
| 2,916,209 | 12/59 | Adamson et al. | 340—347 |
| 2,966,672 | 12/60 | Horn | 340—347 X |
| 2,994,862 | 8/61 | Preston | 340—347.1 |

MALCOLM A. MORRISON, *Primary Examiner.*

IRVING L. SRAGOW, *Examiner.*